US012111973B2

(12) United States Patent
Letkeman et al.

(10) Patent No.: US 12,111,973 B2
(45) Date of Patent: Oct. 8, 2024

(54) SYSTEM AND METHOD TO MANIPULATE VIRTUAL MODEL BASED ON PHYSICAL PARAMETERS OF GESTURE INPUT

(71) Applicant: Shopify Inc., Ottawa (CA)

(72) Inventors: Brennan Letkeman, Calgary (CA); Bradley Joseph Aldridge, Berkeley, CA (US)

(73) Assignee: SHOPIFY INC., Ottawa (CA)

( * ) Notice: Subject to any disclaimer, the term of this patent is extended or adjusted under 35 U.S.C. 154(b) by 105 days.

(21) Appl. No.: 17/902,672

(22) Filed: Sep. 2, 2022

(65) Prior Publication Data

US 2024/0012485 A1 Jan. 11, 2024

Related U.S. Application Data

(60) Provisional application No. 63/358,701, filed on Jul. 6, 2022.

(51) Int. Cl.
*G06F 3/01* (2006.01)
*G06T 19/20* (2011.01)

(52) U.S. Cl.
CPC ............. *G06F 3/017* (2013.01); *G06T 19/20* (2013.01); *G06T 2219/2016* (2013.01); *G06T 2219/2024* (2013.01)

(58) Field of Classification Search
CPC ......... G06V 40/20; G06T 19/00; G06T 19/20; G06T 2219/2016; G06T 2219/2024; G06F 3/011; G06F 3/017; G06F 3/03547; G06F 3/041; G06F 3/0412; G06F 3/04815; G06F 3/04845; G06F 3/0488; G06F 3/04883

USPC .................................................. 345/173, 619
See application file for complete search history.

(56) References Cited

U.S. PATENT DOCUMENTS

| | | | | |
|---|---|---|---|---|
| 9,852,546 | B2 * | 12/2017 | Kraver | G06F 3/012 |
| 10,353,579 | B1 * | 7/2019 | Singer | G06F 3/0484 |
| 11,861,136 | B1 * | 1/2024 | Faulkner | G06F 3/04815 |
| 2011/0107216 | A1 * | 5/2011 | Bi | G06F 3/0481 |
| | | | | 715/863 |
| 2012/0235899 | A1 * | 9/2012 | Han | G06V 40/28 |
| | | | | 345/156 |
| 2020/0097091 | A1 * | 3/2020 | Chou | G06V 40/28 |
| 2022/0084279 | A1 * | 3/2022 | Lindmeier | G06F 3/012 |

* cited by examiner

*Primary Examiner* — Jacinta M Crawford
(74) *Attorney, Agent, or Firm* — Smart & Biggar LP

(57) ABSTRACT

The present disclosure provides AR systems and methods. The computer-implemented method comprises displaying, on a mobile device, a rendered virtual object in an augmented reality (AR) scene, and detecting, using an input device of the mobile device, a gesture having a detected speed. The method further includes identifying the gesture, wherein the gesture is identified as a first command to implement a first function related to the virtual object responsive to the detected speed of the gesture being less than a speed threshold, and the gesture is identified as a second command to implement a second function related to the virtual object responsive to the detected speed of the gesture being greater than the speed threshold. The second command and second function are different from the first command and the first function, respectively. The identified gesture is then processed.

21 Claims, 8 Drawing Sheets

FIG. 3

SYSTEM AND METHOD TO MANIPULATE VIRTUAL MODEL BASED ON PHYSICAL PARAMETERS OF GESTURE INPUT

CROSS-REFERENCE TO RELATED APPLICATION

This application claims priority from U.S. Provisional Patent Application No. 63/358,701, filed Jul. 6, 2022, entitled SYSTEM AND METHOD TO MANIPULATE VIRTUAL MODEL BASED ON PHYSICAL PARAMETERS OF GESTURE INPUT, the contents of which are hereby expressly incorporated into the present application by reference in their entirety.

FIELD

The present disclosure is related to augmented reality systems and methods. In particular, the present disclosure is related to processing a user's gesture input in an augmented reality setting to control virtual models.

BACKGROUND

When engaging with augmented reality (AR) on a mobile device, a user is able to interact with virtual models or objects within the AR scene by providing gesture inputs on the device's touch screen. However, AR interfaces can be cumbersome, especially when using a mobile device (e.g., handheld smartphone or tablet) that provides limited input options and that has a relatively small touchscreen. There are many possible interactions the user can perform with the virtual object, but on a mobile device, the number of intuitive and distinct inputs that could be provided by a user are limited. Current AR interfaces typically rely on a limited number of one or two-finger gesture inputs, physical buttons, and/or displaying options on the screen for the user to select and move in order to interact with the virtual object.

SUMMARY

Simple gestures such as tapping, swiping, panning, and long presses are commonly used to interact with an AR scene on a mobile device. For example, when viewing a virtual object in a 3D preview mode, a user may rotate the virtual object in three dimensions by using a swipe or flick gesture on or around the virtual object. Sometimes two fingers are required to perform a swipe gesture. These gestures may be inputted as touch gestures or via an input device, such as a stylus. When viewing the virtual object in the 3D preview mode, the user may also wish to replace the virtual object with a different object (e.g., if there is a defined list of possible objects, the user may wish to advance to the next object/model in a sequence), or change a feature of the object, such as color, style, or size etc.

In such cases, the virtual object to be replaced or modified must first be selected (using a first selection gesture), and then the replacement object or modification must be found (possibly requiring another gesture to activate a selection menu) and then selected (using another selection gesture). The number of gestures required can be cumbersome, particularly if the user is holding the mobile device at a distance (e.g., to view the AR scene) and performing gestures using only a thumb. Further, displaying the selectable options (in a virtual carousel, for example) takes up screen real estate, which is already limited on a mobile device, and also obscures the AR scene, thus breaking AR immersion.

Thus, in various examples, the present disclosure provides systems and methods to allow for a greater number and variety of input gestures to be used to indicate different functions or commands in an AR scene on a mobile device. The present disclosure further provides improvements to the functioning of the mobile device, as it enables users to interact with AR applications even on mobile devices with small screen sizes. The present use of intrinsic physical gesture parameters to distinguish between and command different AR functions simplifies user interactions with the AR application and is a more efficient use of user gesture input data. This further allows for reduction in the processing power require to process user inputs, since fewer inputs would be required to interact with the AR application.

In some examples, the present disclosure describes a computer-implemented method comprising: displaying, on a mobile device, a rendered virtual object in an augmented reality (AR) scene; detecting, using an input device of the mobile device, a gesture having a detected speed; and identifying the gesture, wherein: the gesture is identified as a first command to implement a first function related to the virtual object responsive to the detected speed of the gesture being less than a speed threshold, and the gesture is identified as a second command to implement a second function related to the virtual object responsive to the detected speed of the gesture being greater than the speed threshold, the second command and second function being different from the first command and the first function, respectively; and processing the identified gesture.

In some examples, the present disclosure describes a system comprising: a processing unit configured to execute instructions to cause the system to: display, on a mobile device, a rendered virtual object in an augmented reality (AR) scene; detect, using an input device of the mobile device, a gesture having a detected speed; and identify the gesture, wherein: the gesture is identified as a first command to implement a first function related to the virtual object responsive to the detected speed of the gesture being less than a speed threshold, and the gesture is identified as a second command to implement a second function related to the virtual object responsive to the detected speed of the gesture being greater than the speed threshold, the second command and second function being different from the first command and the first function, respectively; and process the identified gesture.

In some examples, the present disclosure describes a computer-readable medium storing instructions that, when executed by a processor of a system, causes the system to: display, on a mobile device, a rendered virtual object in an augmented reality (AR) scene; detect, using an input device of the mobile device, a gesture having a detected speed; and identify the gesture, wherein: the gesture is identified as a first command to implement a first function related to the virtual object responsive to the detected speed of the gesture being less than a speed threshold, and the gesture is identified as a second command to implement a second function related to the virtual object responsive to the detected speed of the gesture being greater than the speed threshold, the second command and second function being different from the first command and the first function, respectively; and process the identified gesture.

In any of the above examples, processing the identified gesture comprises: implementing the first function or the second function related to the virtual object on the mobile device based on the gesture being identified as the first command or the second command.

In any of the above examples, the first function includes rotating the virtual object in the AR scene on the mobile device or changing a location of the virtual object within the AR scene.

In any of the above examples, the second function includes replacing the virtual object in the AR scene with a subsequent virtual object in a defined sequence of virtual objects.

In any of the above examples, the second function includes one or more of: changing a color of the virtual object, changing a size of the virtual object, and changing a style of the virtual object.

In any of the above examples, the method is performed in a first mode, the method further comprising: receiving indication to switch to a second mode; detecting, using the input device of the mobile device, another gesture having a second detected parameter; and identifying the other gesture further comprising: the other gesture is identified as a third command to implement a third function related to the virtual object responsive to the second detected parameter of the other gesture being within a parameter range, the third command being different from the first command and the second command, and the third function being different from the first function and the second function.

In any of the above examples, the second detected parameter is a detected direction and the preset parameter range is a preset direction range.

In any of the above examples, the third function includes one or more of: adding the virtual object to a virtual cart, saving current virtual object options, buying the virtual object now, deleting the virtual object from the AR scene, and exiting the AR scene.

In any of the above examples, identifying the other gesture further comprises: the other gesture is identified as a fourth command to implement a fourth function related to the virtual object responsive to the second detected parameter of the other gesture being outside the parameter range, the fourth command being different from the first, second, and third commands, and the fourth function being different from the first, second, and third functions.

In any of the above examples, implementing the first and the second functions depend on the detected speed of the gesture in absence of displaying the first and second functions as selectable options on a screen of the mobile device.

In any of the above examples, further comprising providing a visual, tactile, and/or audible notification indicating whether the first or the second function is being implemented.

BRIEF DESCRIPTION OF THE DRAWINGS

Reference will now be made, by way of example, to the accompanying drawings which show example embodiments of the present application, and in which:

FIG. 3 is an example homepage of an administrator, which may be accessed via the e-commerce platform of FIG. 2;

Similar reference numerals may have been used in different figures to denote similar components.

DESCRIPTION OF EXAMPLE EMBODIMENTS

AR interfaces tend to be cumbersome. There are an innumerable number of possible interactions with virtual models, but limited input options on a mobile device. Current AR interfaces display selectable options, but their display takes up valuable screen space.

The present system and method relates to using physical parameters of gesture inputs in order to distinguish the gesture inputs for indicating different functions or commands in an AR scene on a mobile device. Physical parameters of gesture inputs can be used to differentiate between different input commands when interacting with virtual models.

In some applications, the speed of a swipe or pan gesture may be used to indicate different interactions that the user wishes to implement on the virtual object. Additionally or alternatively, the direction of the swipe or pan gesture may be used to indicate the different interactions that the user may wish to implement on the virtual object.

Figure 1:
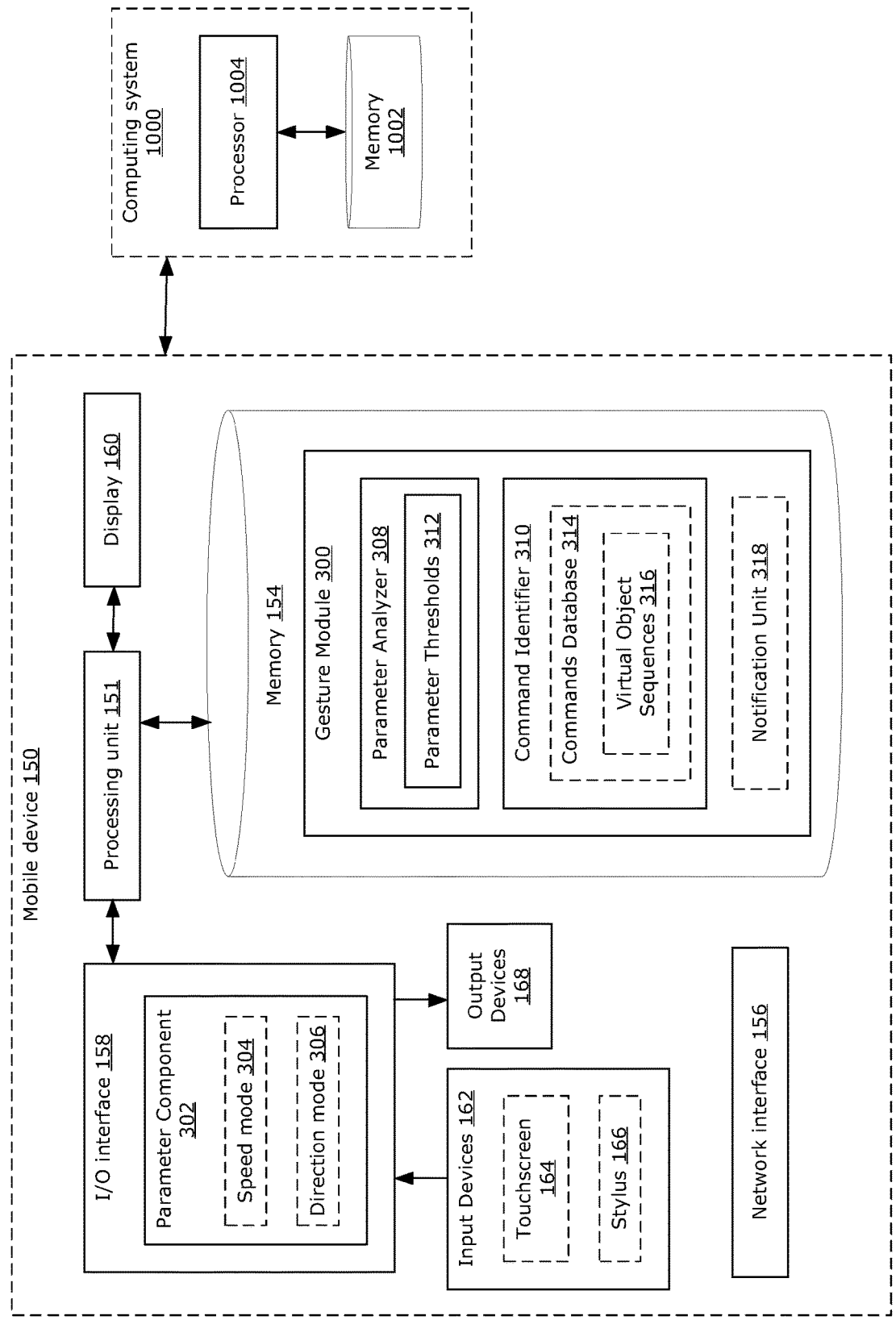
FIG. 1 is a is a block diagram of an embodiment of a mobile device of the present disclosure including a gesture module in which examples described herein may be implemented.

Systems and methods of using physical parameters of gesture inputs in order to distinguish the gesture inputs for indicating different functions or commands in an AR scene, may be employed in association with a mobile device 150, as shown in FIG. 1. An AR application might be provided to render virtual objects in an AR scene for a variety of purposes. The present functionality may be used to more efficiently use user gesture input data in the AR application. The present functionality may also provide a more immersive AR experience, since visual displays of interaction options may be reduced or removed entirely from the mobile screen.

Turning now to the discussion of using physical parameters of gesture inputs for indicating different functions in an AR scene on the mobile device 150, it is first noted that the mobile device 150 could implement the functionality for any of a variety of different AR applications, examples of which are described elsewhere herein.

FIG. 1 illustrates an example embodiment of the mobile device 150 including a gesture module 300. Although the gesture module 300 is illustrated as a distinct component of the mobile device 150, this is only an example. The gesture module 300 could also or instead be provided by another component residing within or external to the mobile device 150.

While the gesture module 300 is shown to form part of the mobile device 150, in other implementations, the gesture module 300 may be provided at least in part by an alternative platform or computing system 1000. For simplicity, the present embodiment describes the operation of the gesture module 300 when the gesture module 300 is implemented in the mobile device 150, however this is not intended to be limiting. For example, at least some functions of the gesture module 300 may additionally or alternatively be implemented on the computing system 1000.

The computing system 1000 is depicted as having at least one processor 1004 and a memory 1002. The processor 1004 may be a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 1002 may include a volatile or non-volatile memory (e.g., a flash memory, a random access memory (RAM), and/or a read-only memory (ROM)). The memory 1002 may store instructions for execution by the processor 1004.

The mobile device 150 may be any mobile electronic device capable of executing an AR application. Examples of suitable electronic devices include smartphones, tablets, laptops, etc., among others. Example components of the mobile device 150 are now described, which are not intended to be limiting. It should be understood that there may be different implementations of the mobile device 150.

The shown mobile device 150 includes at least one processing unit 151, such as a processor, a microprocessor, an application-specific integrated circuit (ASIC), a field-programmable gate array (FPGA), a dedicated logic circuitry, a graphics processing unit (GPU), a central processing unit (CPU), a dedicated artificial intelligence processor unit, or combinations thereof.

The mobile device 150 includes at least one memory 154, which may include a volatile or non-volatile memory (e.g., a flash memory, a random access memory (RAM), and/or a read-only memory (ROM)). The non-transitory memory 154 may store instructions for execution by the processing unit 151, as will be discussed in greater detail further below.

The mobile device 150 includes at least one network interface 156 for wired or wireless communication with an external system or network (e.g., an intranet, the Internet, a P2P network, a WAN and/or a LAN), and in particular for communication with the computing system 1000 in the example shown.

The mobile device 150 includes a display 160 configured to display rendered virtual objects in an AR scene for a variety of purposes. For example, one AR application may involve providing a view of a virtual object (e.g. a potential couch) in a 3D preview mode, for example rendered to appear within a scene of a real-world environment (e.g. in the user's living room).

The mobile device 150 also includes at least one input/output (I/O) interface 158, which interfaces with input and output devices. In some examples, the same component may serve as both input and output device (e.g., the display 160 may be a touch-sensitive display). The mobile device 150 may include other input devices (e.g., buttons, microphone, touchscreen, keyboard, stylus etc.) and other output devices (e.g., speaker, vibration unit, etc.). In the present embodiment, the mobile device 150 includes at least one input device 162 that is configured to receive gesture inputs from the user, such as a touchscreen 164 or a stylus 166. I/O interface 158 of the mobile device 150, in turn, is configured to interface with the input devices 162 that are configured to receive gesture inputs from the user.

Gesture inputs from the user may include tapping, swiping, flicking, and long presses, which may be used to interact with an AR scene, and/or with a virtual object in the AR scene, on the mobile device 150. These gestures may be inputted as touch gestures via the input devices 162, such as the touchscreen 164 and/or the stylus 166. In the case when using the touchscreen 164, sometimes two fingers are required to perform a gesture, such as the swipe gesture. For example, when viewing the virtual object (e.g. the potential couch) in the 3D preview mode (e.g. as a virtual overlay in a scene of the user's real-world living room), the user may rotate the virtual object in three dimensions by using a swipe gesture on or around the virtual object.

In the embodiment depicted in FIG. 1, the I/O interface 158 further comprises a parameter component 302 that is configured to receive gesture inputs from the input devices 162 and to detect/analyze/process the received gesture inputs to identify one or more physical parameters of the received gesture inputs. In the case of a swipe gesture, physical parameters may include features such as a speed and/or a direction of the swipe gesture.

The parameter component 302 is adapted to be able to detect both speed and direction of a swipe gesture. However, the parameter component 302 may be configured to operate in one of multiple modes, including a first mode and a second mode. In the presently depicted embodiment, the first mode may be a speed mode 304, where the parameter component 302 detects speed of the swipe gesture, and the second mode may be a direction mode 306, where the parameter component 302 detects direction of the swipe gesture. Optionally, the parameter component 302 may be configured to operate both the first and second modes simultaneously. Alternatively, the parameter component 302 may be configured to operate in a third mode, which may be a speed and direction mode, where the parameter component 302 detects both the speed and direction of the swipe gesture. In that regard, at least one of the input devices of the mobile device 150 may be further configured to receive indication that the parameter component 302 is to operate in the first speed mode 304, the second direction mode 306, both simultaneously, or the third speed and direction mode.

For example, as the user inputs the swipe gesture via the input device 162 of the mobile device 150, the I/O interface 158 detects and/or calculates the speed at which the user's finger or stylus is moving across the touchscreen 164. As the user inputs the swipe gesture via the input device 162, the I/O interface 158 may additionally or alternatively detect and/or calculate the direction in which the user's finger or stylus is moving across the touchscreen 164 relative to the starting point.

The I/O interface 158 may be configured to detect or determine the physical parameter(s) in real-time during the gesture input. The I/O interface 158 may further continuously output the detected physical parameters in real-time, which may be fed to the processing unit 151 that is executing the AR application. In that regard, if there is a change in the speed and/or direction during the swipe input, the I/O interface 158 may detect and output the change in the physical parameter in real-time.

The at least one memory 154 of the mobile device 150 further includes a gesture module 300, a software module that is executed by the processing unit 151 in communication with the I/O interface 158. The gesture module 300 in the present embodiment provides instructions to the processing unit 151 to receive and process the input gesture and the detected physical parameter(s) of the input gesture from the I/O interface 158, and to identify the input gesture as a command to implement a function associated with the command.

The gesture module 300 comprises a parameter analyzer 308 and a command identifier 310. The parameter analyzer 308 provides instructions to the processing unit 151 to receive and process the input gesture and the related physical parameter(s) from the I/O interface 158. The parameter analyzer 308 includes predefined parameter thresholds 312, which may include one or more predefined speed thresholds and/or one or more predefined direction sectors or ranges.

Similar to the parameter component 302, the gesture module 300 may be executed by the processing unit 151 in one of multiple modes, including the first mode, the second mode, both the first and second mode simultaneously, and the third mode. In the presently depicted embodiment, the first mode may be the speed mode, the second mode may be the direction mode, and the third mode may be the speed and direction mode.

In the speed mode 304, the determined speed of the swipe gesture is analyzed, and the parameter analyzer 308 provides instructions to the processing unit 151 to compare the swipe speed with a given predefined speed threshold, to determine whether the swipe speed is less than the given predefined speed threshold. If multiple predefined speed thresholds are used, the parameter analyzer 308 may provide instructions to the processing unit 151 to compare the swipe speed with the multiple predefined speed thresholds to determine where the swipe speed falls relative to the multiple predefined speed thresholds.

In the direction mode 306, the determined direction of the swipe gesture is analyzed. The parameter analyzer 308 may provide instructions to the processing unit 151 to compare the swipe direction with one (or more) of the predefined direction sectors. To that end, the parameter analyzer 308 provides instructions to the processing unit 151 to determine whether the swipe direction falls within or outside one of the predefined direction sectors, or to determine which of the multiple direction sectors the swipe direction falls within. When analyzing the swipe gesture with the determined direction, the parameter analyzer 308 may alternatively provide instructions to the processing unit 151 to decompose the direction vector into x and y-components in order to determine the swipe direction to be mainly vertical or mainly horizontal, and/or to determine the direction to be mainly positive or mainly negative relative to the starting point.

In the speed mode and the direction mode together, or when in the third speed and direction mode, both the determined speed and direction of the swipe gesture are analyzed. The parameter analyzer 308 may provide instructions to the processing unit 151 to compare the swipe speed with the given predefined speed threshold as described above, and to compare the swipe direction with one (or more) of the predefined direction sectors as described above. In such cases, the determination would involve both whether the swipe speed is more/less than the predefined speed threshold, and whether the swipe direction is inside/outside the predefined direction range or whether the swipe direction is mainly vertical/horizontal and mainly positive/negative.

Based on the mode and the determinations made by the processing unit 151 after executing instructions from the parameter analyzer 308, the command identifier 310 provides instructions to the processing unit 151 to identify the input gesture (with its associated physical parameter(s)) as a particular command to implement a function associated with that particular command. To do so, the command identifier 310 may include a commands database 314. The commands database 314 generally comprises lists or rules that associate a command to implement a particular function (related to the virtual object) with a particular parameter analysis determination.

For example, in the speed mode, if the swipe speed was determined to be below the given predefined speed threshold, the command identifier 310 provides instructions to the processing unit 151 to consult the commands database 314 to identify this swipe gesture and its corresponding command. The corresponding command may be a first command to implement a first function related to the virtual object. If the swipe speed was determined to be above the given predefined speed threshold, the command identifier 310 provides instructions to the processing unit 151 to consult the commands database 314 to identify this swipe gesture and its corresponding command. The corresponding command may be a second command to implement a second function related to the virtual object. The second command and the second function would be different from the first command and the first function, respectively.

In some applications, the first function may be rotating the virtual object in the AR scene on the display 160 of the mobile device 150 or may be changing a location of the virtual object within the AR scene. The second function may be replacing the virtual object in the AR scene on the display 160 with a subsequent virtual object. In such an application, the commands database 314 may further include one or more predefined sequences of virtual objects 316. The sequence of virtual objects 316 may be a list of virtual objects predefined in a number of says, such as predefined by the AR application, predefined by the user, predefined by a third-party consultant, or that represent products in the user's wishlist or virtual cart. Thus, in the case of command- ing replacement of the virtual object in the AR scene on the display 160, the replacement virtual object may be the subsequent virtual object in a given sequence of virtual objects 316.

Alternatively, the first and/or second function may instead be one or more of a variety of other functions related to the virtual object, such as changing a color of the virtual object, changing a size of the virtual object, and changing a style of the virtual object.

If multiple predefined speed thresholds are used, a greater number of possible swipe speed determinations may be made, and the commands database 314 may have a greater number of commands to be identified with a greater number of corresponding different functions. In such cases, the commands database 314 may have more than two commands corresponding to more than two different functions. Each of the more than two different functions may be the functions as described above.

If the swipe direction was analyzed in the direction mode, the command identifier 310 may provide instructions to the processing unit 151 to consult the commands database 314 to identify this swipe gesture and its corresponding command in a similar manner as noted above. If the swipe direction was determined (for example) to be within the given predefined direction sector, or to be mainly vertical and positive, the command identifier 310 may provide instructions to the processing unit 151 to consult the commands database 314 to identify this swipe gesture and its corresponding command. The corresponding command may be a third command to implement a third function related to the virtual object. For example, the third function may be duplicating or adding another one of the virtual object in the virtual AR scene. If the swipe direction was determined to be outside the given predefined direction sector, or to be mainly vertical and negative, the command identifier 310 may provide instructions to the processing unit 151 to consult the commands database 314 to identify this swipe gesture and its corresponding command. The corresponding command may be a fourth command to implement a fourth function related to the virtual object. The fourth function may be deleting the virtual object from the virtual AR scene.

In another example in the direction mode, if the swipe direction was determined to be within another predefined direction sector, or to be mainly horizontal, the command identifier 310 may provide instructions to the processing unit 151 to consult the commands database 314 to identify this swipe gesture and its corresponding command. The corresponding command may be a fifth command to implement a fifth function related to the virtual object. For example, the fifth function may be changing the color, size, or style of the virtual object, or changing the virtual background scene. In such a case, the described features may be implemented in other real-and-virtual environments other than AR applications, including virtual reality (VR), mixed reality (MR), and/or extended reality (XR) applications on the mobile device 150.

The third, fourth, and fifth functions may be other actions as known in the AR field and may be different from the first and second functions noted above. The other actions/functions in the AR field include saving the existing virtual object options, resetting the virtual object to a default state, exiting the program entirely, etc.

After the processing unit 151 has identified the command, the gesture module 300 may be configured to further provide instructions to the processing unit 151 to implement the first, second, third, fourth, or fifth function related to the virtual object on the mobile device 150 based on the gesture being identified as the first, second, third, fourth, or fifth command.

Optionally, the gesture module 300 may further comprise a notification unit 318. The notification unit 318 provides instructions to the processing unit 151 to providing a visual, tactile, and/or audible notification via the output devices 168 to indicate or help clarify to the user which functionality the user's gesture input has activated/is being implemented. The visual, tactile, and/or audible notifications may also change if/when the user's gesture input changes and/or when the parameter of the gesture input to be analyzed changes.

The present use of physical gesture parameters to distinguish between, and command, different AR functions simplifies user interactions with the AR application. It is a more efficient use of user gesture input data, since implementing the first, second, third, fourth, fifth etc. functions as described above depends on intrinsic physical parameters of the gesture input, such as detected speed and/or direction of the gesture. This allows for reduction in the processing power required to process user inputs, since fewer inputs would be required to interact with the AR application. The present use of physical gesture parameters to distinguish between, and command, different AR functions further provides improvements to the functioning of the mobile device, as it enables users to interact with AR applications even on mobile devices with small screen sizes. No selectable options need to be displayed on the display 160 of the mobile device 150 in order for the user to indicate which of a variety of different functions they wish to perform, and how to do so. This provides a more immersive AR experience, as visual displays of interaction options may be reduced or removed entirely from the mobile screen.

While the above features may be implemented without visual displays of interaction options, in other applications, the above features may be implemented with the known carousels (or other visual option displays) in the AR interface, and/or along with other non-touch screen input devices.

Additionally, the above features may be implemented in other real-and-virtual environments other than AR applications, including virtual reality (VR), mixed reality (MR), and/or extended reality (XR) applications on the mobile device 150.

Example E-Commerce Implementations

AR applications may be used in the context of online shopping using an e-commerce platform in a number of ways. For example, AR applications may be used to view a virtual model representing a purchasable product in the AR scene, to simplify user interactions in the shopping process by allowing the user to easily scroll through their wishlist/virtual cart to view a sequence of virtual models in the AR scene, to allow a user to easily add a product represented by a virtual model to the virtual cart without having to go through complex menu selections etc. An example of an e-commerce platform and a mobile device configured to perform the above is described below.

However, it should be understood that this discussion is only for the purpose of illustrating an example e-commerce platform and is not intended to be limiting as to the nature of an e-commerce system with which the subject matter of the present application may be implemented. Further, it should be understood that the present disclosure may be implemented in other contexts, and is not necessarily limited to implementation in an e-commerce platform and a mobile device. For example, the present disclosure may be implemented in the context of any other platform that supports service instances (e.g., a web hosting platform), without necessarily supporting any e-commerce. Other such possibilities are contemplated within the scope of the present disclosure.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 2:
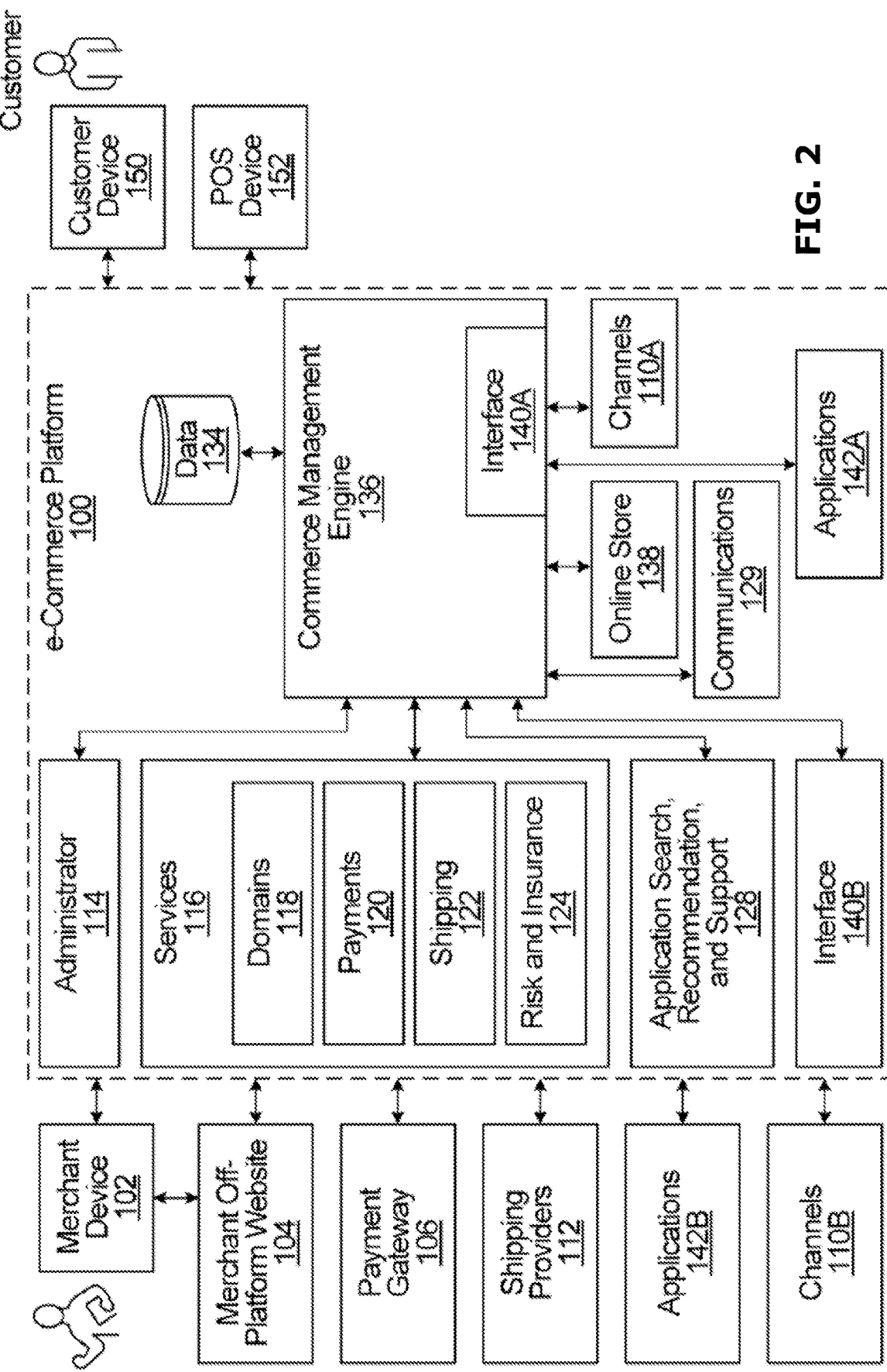
FIG. 2 is a block diagram of an example e-commerce platform and a customer device, which may be an example implementation of the system of FIG. 1.

FIG. 2 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 2, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 3:
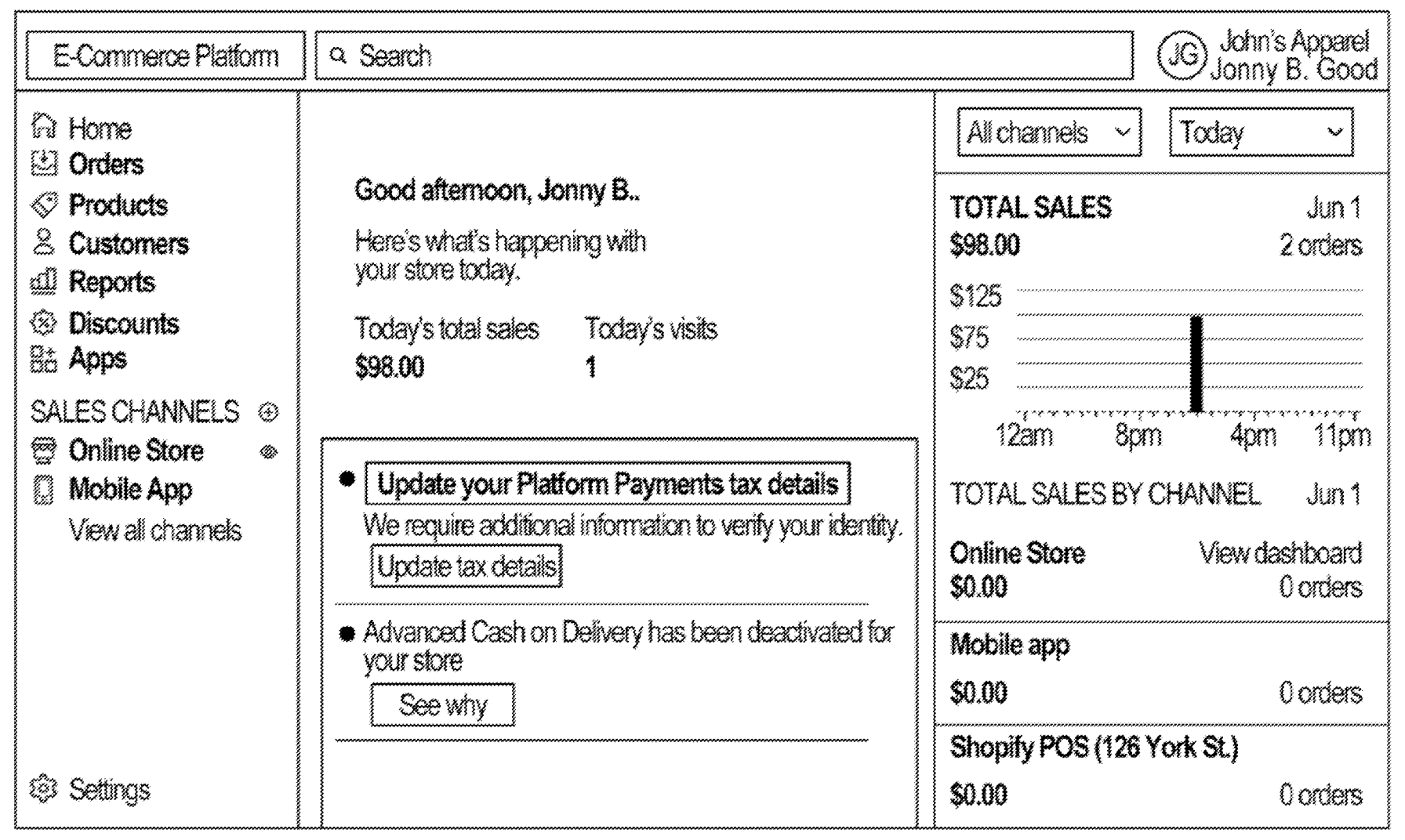

FIG. 3 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalogue, managing orders, and/or the like. In some embodiments, the merchant may be able to access the different sections of the administrator 114 by using a sidebar, such as the one shown on FIG. 3. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 2, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales) (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

In some examples, the applications 142A-B may include an application that enables a user interface (UI) to be displayed on the customer device 150. In particular, the e-commerce platform 100 may provide functionality to enable content associated with an online store 138 to be displayed on the customer device 150 via a UI.

Implementation on a Mobile Device with an e-Commerce Platform

Having discussed an example e-commerce platform, discussion of systems and methods of distinguishing a user's commands based on physical parameters of the user's gesture input in an AR setting, as may be employed in association with such platforms and a mobile device is provided. In some implementations, the functionality described herein may be used in commerce to provide improved customer or buyer experiences.

Figure 4:
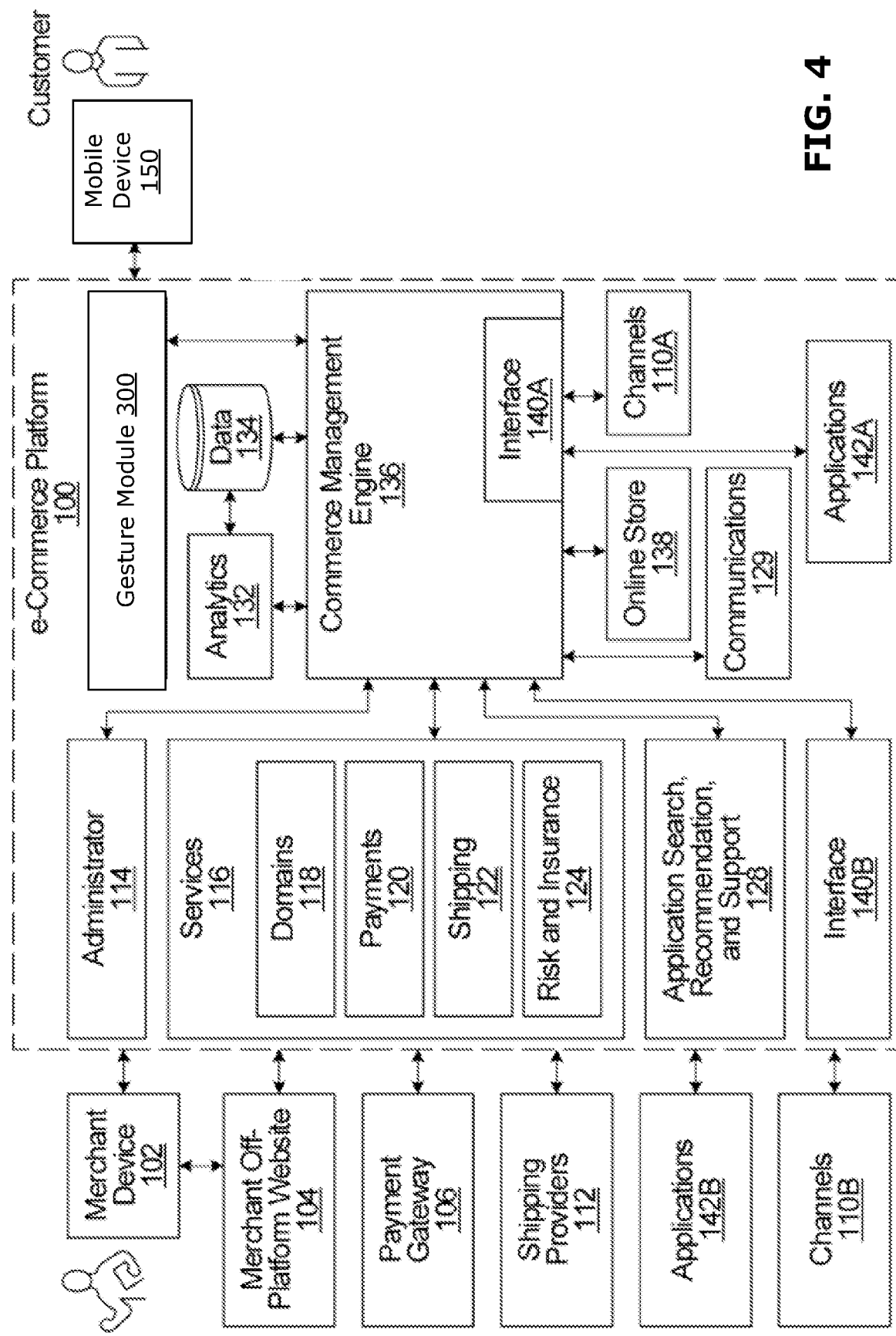
FIG. 4 is another block diagram of the example e-commerce platform including a gesture module and the mobile device of FIG. 1, in which examples described herein may be implemented.

For example, FIG. 4 illustrates the e-commerce platform 100 of FIG. 2 coupled to the mobile user device 150 (see above), but including a gesture module 300. As described above, the mobile user device 150 may receive gesture inputs via input devices 162. The parameter component 302 of the I/O interface 158 may, in turn, detect or otherwise determine physical parameters of the gesture inputs.

Although the gesture module 300 is illustrated as a distinct component of the e-commerce platform 100 in FIG. 4, this is only an example. The gesture module 300 could also or instead be provided by another component residing within or external to the e-commerce platform 100. In some embodiments, either or both of the applications 142A-B may provide an embodiment of the gesture module 300 that implement the functionality described herein. The location of the gesture module 300 may be implementation specific.

In some implementations, the examples disclosed herein may be implemented using a different platform that is not necessarily (or is not limited to) the e-commerce platform 100. In general, examples of the present disclosure are not intended to be limited to implementation on the mobile device 150 and the e-commerce platform 100.

Figure 5:
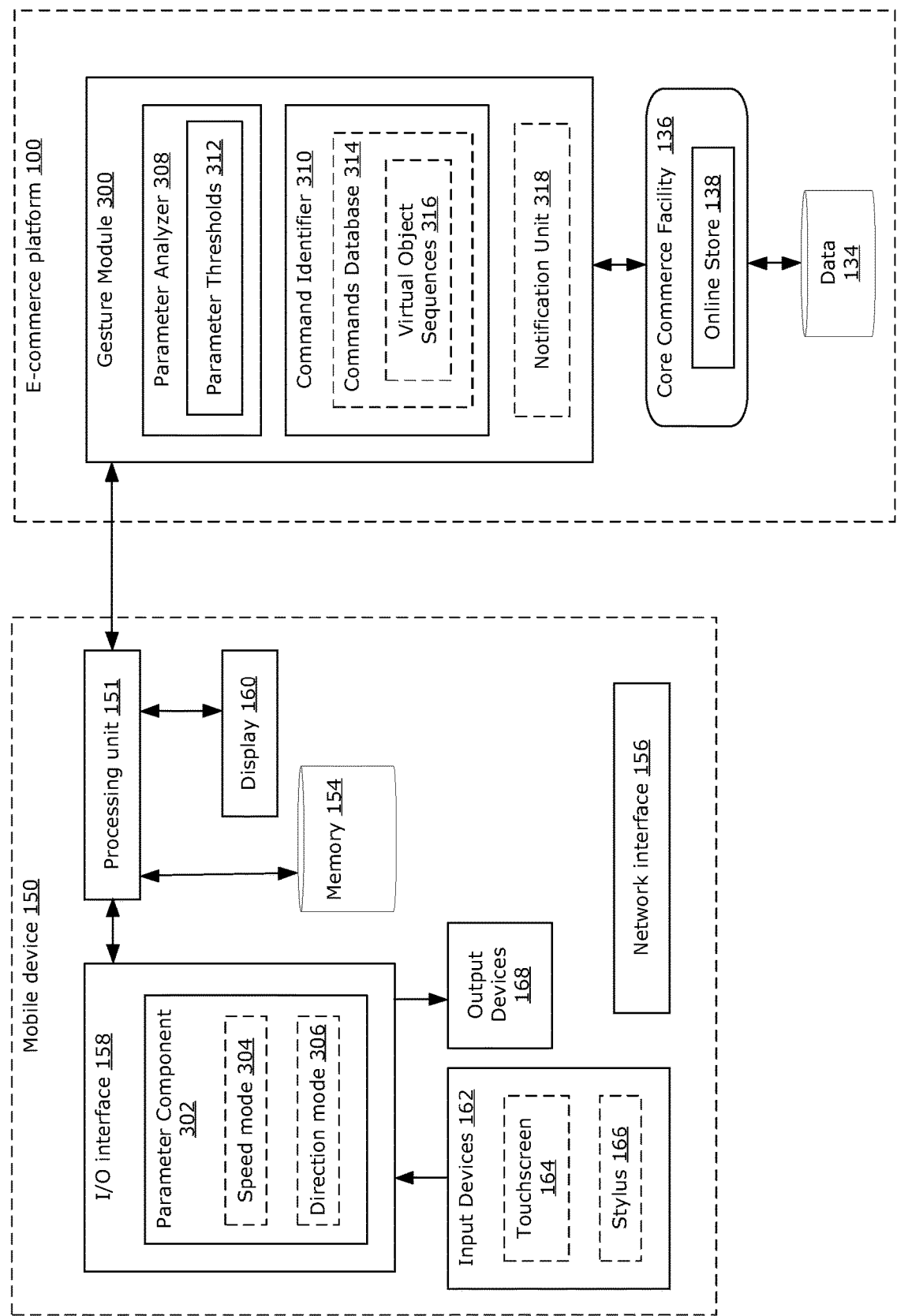
FIG. 5 is another block diagram of the e-commerce platform and the user device of FIG. 4, showing details related to the gesture module according to an embodiment.

FIG. 5 is another depiction of the mobile user device 150 and the e-commerce platform 100 that omits some details that have been described with reference to FIG. 2, and shows further details of the gesture module 300 discussed above. In particular, FIG. 5 illustrates some example details of the mobile user device 150 and the e-commerce platform 100 that are relevant to distinguishing a user's commands based on physical parameters of the user's gesture input in an AR setting on the mobile device 150. Some details of the e-commerce platform 100 are not shown, to avoid clutter.

In the illustrated implementation of FIG. 5, rather than residing in the mobile device 150 as described above, the gesture module 300 is shown forming part of the e-commerce system 100. When in use with the e-commerce platform 100 (which may be an instance of the computing system 1000 of FIG. 1), the mobile user device 150 may process the physical parameters and identify associated commands and functions related to the virtual object (as described above) based on instructions from the gesture module 300 from the e-commerce platform 100. Alternatively, the mobile device 150 may send the gesture input parameters to the e-commerce system 100, then the e-commerce system 100 may process the physical parameters and identify associated commands and functions related to the virtual object (as described above). The e-commerce system 100 may then return the determinations from the gesture module 300 back to the mobile device 150 to instruct the mobile device 150 to implement the corresponding function related to the virtual object accordingly.

Given the e-commerce platform application, the commands and corresponding functions listed in the commands database 314 may further include functions that relate to online shopping functionalities. Such functions may include buying the product represented by the virtual object now, adding the product represented by the virtual object to a virtual cart, and returning/exchanging the product represented by the virtual object if it was purchased.

Figure 6:
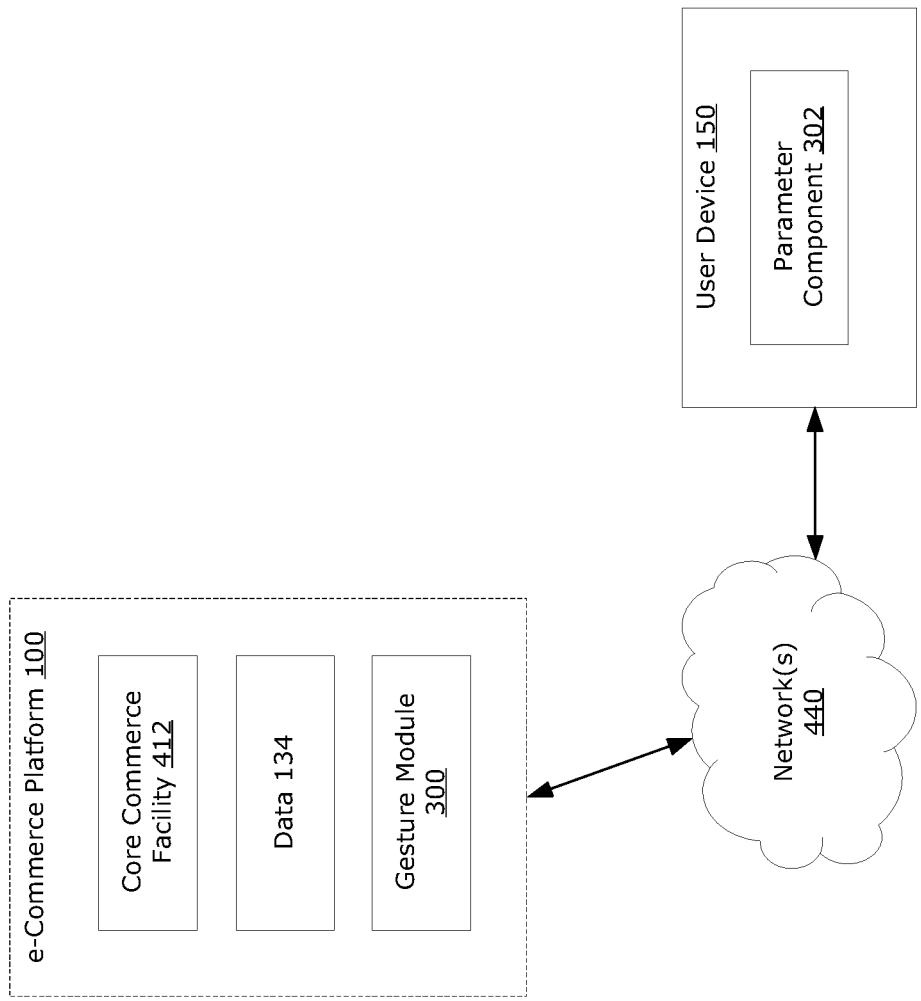
FIG. 6 is a block diagram illustrating an example implementation of the e-commerce platform and mobile device of FIG. 5.

FIG. 6 is a block diagram of an example hardware configuration of the e-commerce platform 100 in communication with the mobile user device 150. For simplicity, one mobile device 150 is shown in FIG. 6, however it should be understood that there may be any number of customer mobile devices 150 in communication with the e-commerce platform 100. Customers using mobile devices 150 may access the e-commerce platform 100 via one or more networks 440 (e.g., wired and/or wireless networks, including a virtual private network (VPN), the Internet, and the like).

Method

Figure 7:
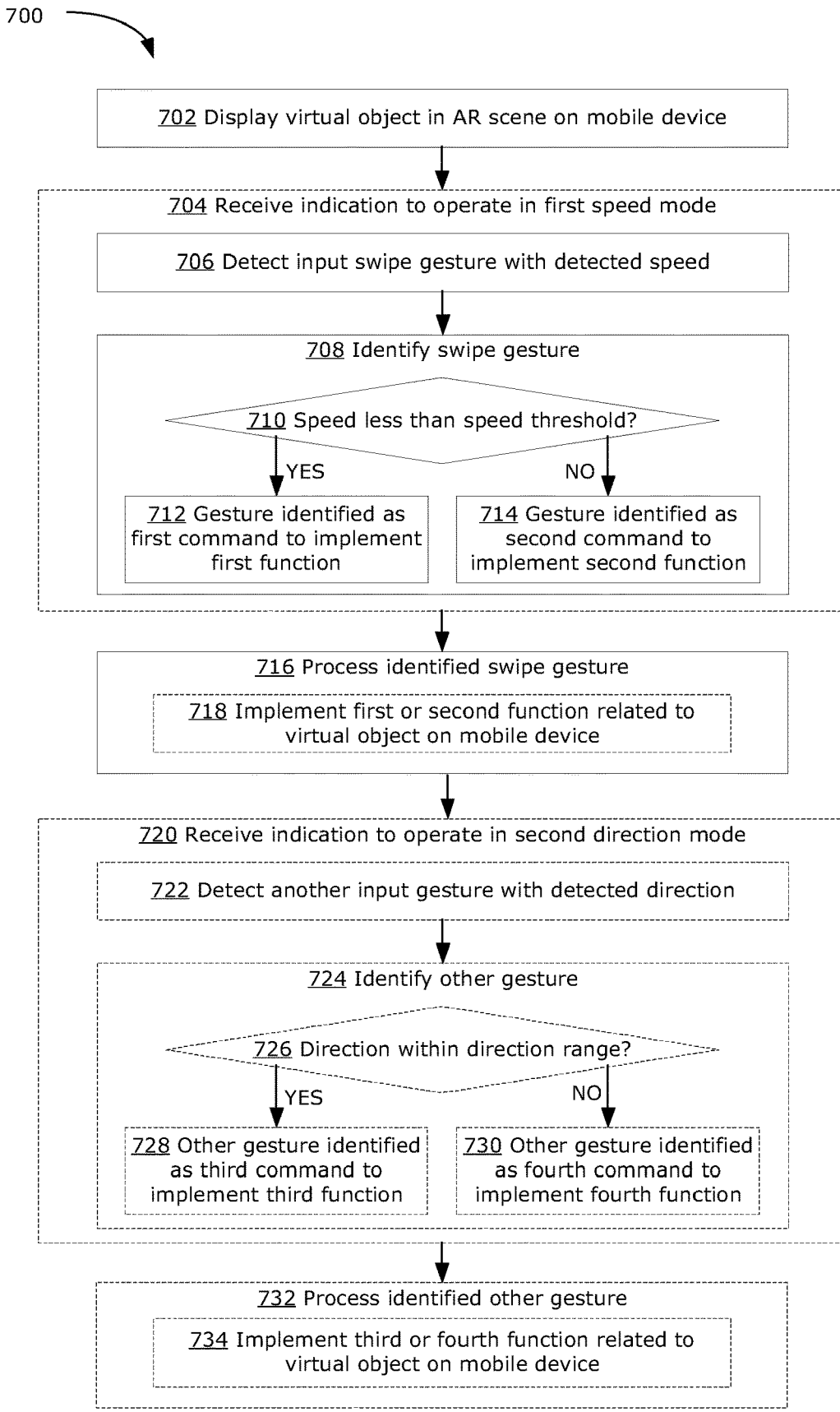
FIG. 7 is a flowchart illustrating a method for using gesture inputs to indicate AR commands on a mobile device according to examples of the present disclosure.

FIG. 7 is a flowchart illustrating an example method 700 for distinguishing a user's commands based on physical parameters of the user's gesture input in an AR setting on a mobile device. The example method 700 may be performed by the mobile device 150, the computing system 1000, and/or the e-commerce platform 100 as described above using the gesture module 300, for example. In particular, the method 700 may be performed in real-time (or near real-time) by the user.

At an operation 702, a virtual object may be displayed in an AR scene rendered on a mobile device. For example, a virtual couch may be displayed as a virtual overlay in a view of the real-world setting of the user's living room on the user's mobile device.

Optionally at an operation 704, an indication to operate in a first mode may be received. As noted above, the parameter component 302 of the I/O interface 158 may be adapted to detect both speed and direction of a swipe gesture and to operate in one of multiple modes, including a first mode and a second mode. In the presently depicted embodiment, the first mode may be a speed mode 304, where the parameter component 302 detects speed of the swipe gesture. In some examples, the first mode may be used by default. In other examples, the first mode may be indicated by an explicit indication, such as selection of a virtual UI element (e.g., virtual button). In yet other examples, the first mode may be indicated implicitly. For example, detection of a swipe gesture that exceeds a predefined speed threshold may be considered an implicit indication to operate in the first mode. In another example, if both speed and direction of the swipe gesture are detected, then a swipe gesture that is mostly along a defined direction (e.g., mostly in the x-direction) may be an implicit indication to operate in the first mode.

Then at an operation 706, a speed of an input swipe gesture (from an input device 162) is detected. The speed of the gesture input may be detected or determined in real-time, and may further be continuously detected/determined during the gesture input in real-time. Thus, if there is a change in the speed during the swipe input, the I/O interface 158 may detect and output the change in the physical parameter in real-time.

At an operation 708, the swipe gesture is identified as a particular command based on its detected physical parameter. Thus, at an operation 710, a determination is made whether the detected speed of the input swipe gesture is less than a predefined speed threshold. If multiple predefined speed thresholds are used, the swipe speed may be compared with the multiple predefined speed thresholds to determine where the swipe speed falls relative to the multiple predefined speed thresholds.

If the detected speed of the input swipe gesture is less than the predefined speed threshold, at an operation 712, the swipe gesture is identified as a first command to implement a first function. If the detected speed of the input swipe gesture is not less than the predefined speed threshold (i.e. is equal or greater than the predefined speed threshold), at an operation 714, the swipe gesture is identified as a second command to implement a second function. In order to identify the correct command and function, a commands database 314 may be consulted. The commands database 314 contains lists or rules setting out which gesture with which physical parameter corresponds with which command and corresponding function. In the present case, the second command and the second function would be different from the first command and the first function, respectively.

In some applications, the first function may be rotating the virtual object in the AR scene on the display 160 of the mobile device 150 or may be changing a location of the virtual object within the AR scene. The second function may be replacing the virtual object in the AR scene on the display 160 with a subsequent virtual object. In such an application, the commands database 314 may further include one or more predefined sequences of virtual objects 316. As noted above, the sequence of virtual objects 316 may be a list of virtual objects predefined in a number of says, such as predefined by the AR application, predefined by the user, predefined by a third-party consultant, or that represent products in the user's wishlist or virtual cart. Thus, in the case of commanding replacement of the virtual object in the AR scene on the display 160, the replacement virtual object may be the subsequent virtual object in a given sequence of virtual objects 316. Alternatively, the first and/or second function may instead be one or more of a variety of other functions related to the virtual object, such as changing a color of the virtual object, changing a size of the virtual object, and changing a style of the virtual object.

If multiple predefined speed thresholds are used, a greater number of possible swipe speed determinations may be made, and the commands database 314 may have a greater number of commands to be identified with a greater number of corresponding different functions.

Once the swipe gesture is identified, at an operation 716, the identified swipe gesture (i.e. identified as the first or second command) is processed. For example, at an operation 718, the first or second command is implemented on/related to the virtual object on the mobile device 150. If the virtual object is a couch and the first command is implemented, the couch may be rotated in the AR scene or moved within the AR scene. If the virtual object is a couch and the second command is implemented, the couch may be replaced with a subsequent virtual object from a given sequence of virtual objects 316, such as a virtual armchair. Alternatively, the color, size, or style of the virtual couch may be changed within the AR scene when the second command is implemented.

Optionally at an operation 720, an indication to operate in a second mode may be received. In the presently depicted embodiment, the second mode may be a direction mode 306, where the parameter component 302 detects a direction of the swipe gesture. In some examples, the indication to operate in the second mode may be an explicit indication, such as selection of a virtual UI element (e.g., virtual button). In other examples, the indication to operation in the second mode may be an implicit indication. For example, if both speed and direction of the swipe gesture are detected, then a swipe gesture that is mostly along a defined direction (e.g., mostly in the y-direction) may be an implicit indication to operate in the second mode.

Then at an operation 722, a direction of another input swipe gesture (from the input device 162) may be detected. Additionally, the detected direction may further be decomposed into x and y-components in order to determine the swipe direction to be mainly vertical or mainly horizontal, and/or to determine the direction to be mainly positive or mainly negative relative to the starting point.

The direction of the other swipe gesture input may be detected or determined in real-time, and may further be continuously detected/determined during the gesture input in real-time. Thus, if there is a change in the direction during the swipe input, the I/O interface 158 may detect and output the change in the physical parameter in real-time.

At an operation 724, the other swipe gesture may be identified as a particular command based on its detected physical parameter. Thus, at an operation 724, a determination may be made whether the detected direction of the other input swipe gesture is within a predefined direction sector or range. If multiple predefined direction sectors are used, the swipe direction may be compared with the multiple predefined direction sectors to determine which sector the swipe direction falls in.

If the detected direction of the input swipe gesture falls within the predefined direction sector, at an operation 728, the other swipe gesture may be identified as a third command to implement a third function. If the detected direction of the other input swipe gesture is outside the predefined direction sector, at an operation 730, the other swipe gesture may be identified as a fourth command to implement a fourth function. In order to identify the correct command and function, the commands database 314 may be consulted. In the present case, the third and fourth commands and functions would be different from each other, and from the first and second commands and the first and second functions, respectively.

In the present application, each of the third or fourth function may be one of adding the virtual object to a virtual cart, saving the current virtual object options, buying the product associated with the virtual object now, deleting the virtual object from the AR scene, exiting the AR scene altogether, etc.

In an alternative application, if the detected direction of the other swipe gesture was further decomposed into x and y-components, at an operation 724, the determination may be made whether the detected direction is mainly vertical or horizontal, and mainly positive or negative. In such a case, if the detected direction of the input swipe gesture is mainly vertical and positive, the other swipe gesture may be identified as the third command to implement the third function. The third function may be to add the product represented by the virtual object to a virtual cart. If the detected direction of the other input swipe gesture is mainly vertical and negative, the other swipe gesture may be identified as the fourth command to implement the fourth function. The fourth function may be to delete the virtual object from the AR scene. In order to identify the correct command and function, the commands database 314 may also be consulted. If the swipe direction was determined to be mainly horizontal, the other swipe gesture may be identified as a fifth command to implement a fifth third function. The fifth function may be changing the color, size, or style of the virtual object, or changing the virtual background scene.

Once the other swipe gesture is identified, at an operation 732, the identified other swipe gesture (i.e. identified as the third, fourth, or fifth command) is processed. For example, at an operation 734, the third, fourth, or fifth command is implemented on the virtual object on the mobile device 150. If the virtual object is a couch and the third, fourth, or fifth command is implemented, the virtual couch may added to a virtual cart, current couch options may be saved, the couch may be purchased immediately, the couch may be from the user's virtual living room scene, or the AR application may be exited altogether. Alternatively, the color, size, or style of the virtual couch may be changed within the AR scene if the fifth command is implemented.

In the embodiment of the method 700 described above, the first mode is the speed mode while the second mode is the direction mode. In an alternative application, the method may operate where the first required mode is instead the direction mode, and the second optional mode is the speed mode. In such a case, the input swipe gesture detected at the operation 706 would have a detected direction, and the identification of the swipe gesture at 708 would be based on the direction determinations described above. Accordingly, the detection of the other input gesture with detected speed at the operation 722 would be optional, and the identification of the other swipe gesture at 724 based on the speed determinations as described above would also be optional.

Figure 8:
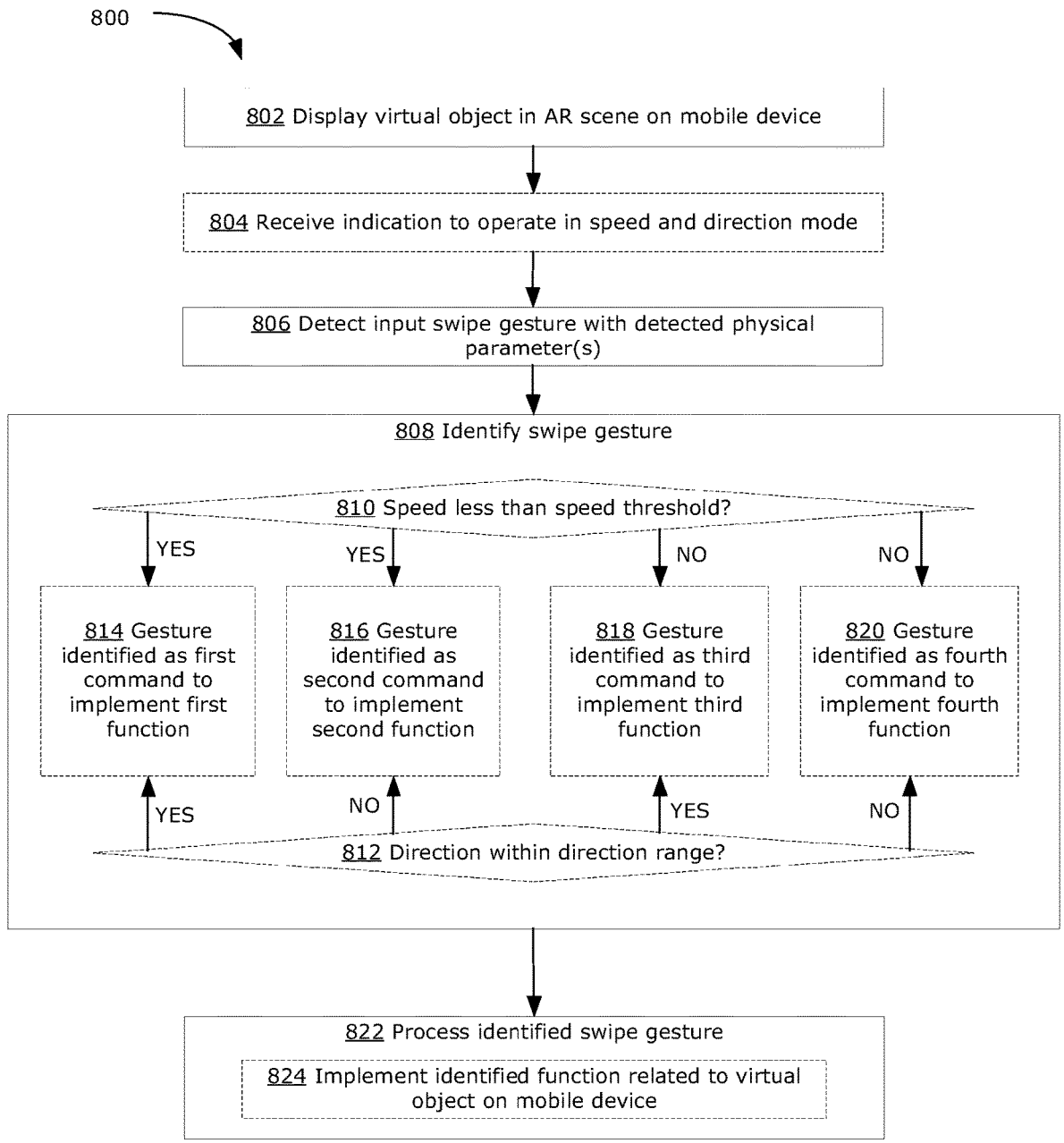
FIG. 8 is a flowchart illustrating another method for using gesture inputs to indicate AR commands on a mobile device according to examples of the present disclosure.

FIG. 8 is a flowchart of an example method 800 illustrating the possibility of operating both the speed mode and the direction mode at the same time, or operating the third speed and direction mode. The method 800 is similar to the method 700.

At an operation 802, a virtual object may be displayed in an AR scene rendered on a mobile device.

Optionally at an operation 804, an indication to operate in the first (speed), second (direction), or third (speed and direction) mode may be received.

Then at an operation 806, one or more physical parameters (including speed and direction) of an input swipe gesture (from an input device 162) is detected.

At an operation 808, the swipe gesture is identified as a particular command based on its one or more detected physical parameter. Thus, at an operation 810 and 812, a determination is made whether the detected speed of the input swipe gesture is less than a predefined speed threshold and whether the detected direction of the input swipe gesture is within the predefined direction sector, as described above.

At an operation 814, if the detected speed of the input swipe gesture is less than the predefined speed threshold and within the predefined direction range/sector, the swipe gesture may be identified as a first command to implement a first function. At an operation 816, if the detected speed of the input swipe gesture is less than the predefined speed threshold but not within the predefined direction range/sector, the swipe gesture may be identified as a second command to implement a second function. At an operation 818, if the detected speed of the input swipe gesture is not less than the predefined speed threshold and within the predefined direction range/sector, the swipe gesture may be identified as a third command to implement a third function. At an operation 820, if the detected speed of the input swipe gesture is not less than the predefined speed threshold and not within the predefined direction range/sector, the swipe gesture may be identified as a fourth command to implement a fourth function. In order to identify the correct command and function, the commands database 314 may be consulted.

Once the swipe gesture is identified, at an operation 822, the identified swipe gesture (i.e. identified as the first, second, third, or fourth command) is processed. For example, at an operation 824, the first, second, third, or fourth command that is related to the virtual object on the mobile device 150 as described above is implemented. For example, the first command related to the virtual object may be a command to rotate the virtual object within the AR scene; the second command related to the virtual object may be to replace the virtual object with a subsequent virtual object from a given sequence of virtual objects 316; the third command related to the virtual object may be to add the product represented by the virtual object to a virtual card; and the fourth command related to the virtual object may be to delete the virtual object from the AR scene.

Optionally, the methods 700 and 800 may further include providing a visual, tactile, and/or audible notification to the user to indicate or help clarify to the user which functionality the user's gesture input has activated or is being implemented. The visual, tactile, and/or audible notifications may also change if/when the user's gesture input changes and/or when the parameter of the gesture input to be analyzed changes.

The present use of physical gesture parameters to distinguish between, and command, different AR functions simplifies user interactions with the AR application. It is a more efficient use of user gesture input data, since implementing the first, second, third, fourth, fifth etc. functions as described above depends on intrinsic physical parameters of the gesture input, such as detected speed and/or direction of the gesture. No selectable options need to be displayed on the display 160 of the mobile device 150 in order for the user to indicate which of a variety of different functions they wish to perform, and how to do so. This provides a more immersive AR experience, as visual displays of interaction options may be reduced or removed entirely from the mobile screen.

While the above method steps may be implemented without visual displays of interaction options, in other applications, the above features may be implemented with the known carousels (or other visual option displays) in the AR interface, and/or along with other non-touch screen input devices.

Additionally, the above features may be implemented in other real-and-virtual environments other than AR applications, including virtual reality (VR), mixed reality (MR), and/or extended reality (XR) applications on the mobile device 150.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer-implemented method comprising:
 displaying, on a mobile device, a virtual model of a product rendered in an augmented reality (AR) scene;

detecting, using an input device of the mobile device, a gesture having a detected speed; and identifying the gesture as a command affecting the virtual model within the AR scene, wherein:

the gesture is identified as a first command to implement a first function that manipulates the virtual model within the AR scene responsive to the detected speed of the gesture being less than a speed threshold, and the gesture is identified as a second command to implement a second function that replaces the virtual model within the AR scene with a subsequent virtual model of another product in a defined sequence of virtual models responsive to the detected speed of the gesture being greater than the speed threshold; and processing the identified gesture.

2. The method of claim 1, wherein processing the identified gesture comprises: implementing the first function that manipulates the virtual model within the AR scene or implementing the second function that replaces the virtual model within the AR scene with the subsequent virtual model based on the gesture being identified as the first command or the second command.

3. The method of claim 1, wherein the first function includes rotating the virtual model in the AR scene on the mobile device or changing a location of the virtual model within the AR scene.

4. The method of claim 1, wherein the method is performed in a first mode, the method further comprising:

receiving indication to switch to a second mode;

detecting, using the input device of the mobile device, another gesture having a second detected parameter; and identifying the other gesture further comprising:

the other gesture is identified as a third command to implement a third function related to the virtual model responsive to the second detected parameter of the other gesture being within a parameter range, the third command being different from the first command and the second command, and the third function being different from the first function and the second function.

5. The method of claim 4, wherein the second detected parameter is a detected direction and the preset parameter range is a preset direction range.

6. The method of claim 4, wherein the third function includes one or more of:

adding the product corresponding to the virtual model to a virtual cart, saving current virtual model options, buying the product corresponding to the virtual model, deleting the virtual model from the AR scene, or exiting the AR scene.

7. The method of claim 4, wherein identifying the other gesture further comprises:

the other gesture is identified as a fourth command to implement a fourth function related to the virtual model responsive to the second detected parameter of the other gesture being outside the parameter range, the fourth command being different from the first, second, and third commands, and the fourth function being different from the first, second, and third functions.

8. The method of claim 1, wherein implementing the first and the second functions depend on the detected speed of the gesture in absence of displaying the first and second functions as selectable options on a screen of the mobile device.

9. The method of claim 1, further comprising providing a visual, tactile, and/or audible notification indicating whether the first or the second function is being implemented.

10. The method of claim 1, wherein the AR scene includes the virtual model rendered in a virtual background, and wherein the gesture causes the virtual model to be manipulated or replaced in the virtual background.

11. A system comprising:

a processing unit configured to execute instructions to cause the system to:

display, on a mobile device, a virtual model of a product rendered in an augmented reality (AR) scene;

detect, using an input device of the mobile device, a gesture having a detected speed; and identify the gesture as a command affecting the virtual model within the AR scene, wherein:

the gesture is identified as a first command to implement a first function that manipulates the virtual model within the AR scene responsive to the detected speed of the gesture being less than a speed threshold, and the gesture is identified as a second command to implement a second function that replaces the virtual model within the AR scene with a subsequent virtual model of another product in a defined sequence of virtual models responsive to the detected speed of the gesture being greater than the speed threshold; and process the identified gesture.

12. The system of claim 11, wherein the processing unit is further configured to execute instructions to cause the system to process the identified gesture by implementing the first function that manipulates the virtual model within the AR scene or implementing the second function that replaces the virtual model within the AR scene with the subsequent virtual model based on the gesture being identified as the first command or the second command.

13. The system of claim 11, wherein the first function includes rotating the virtual model in the AR scene on the mobile device or changing a location of the virtual model within the AR scene.

14. The system of claim 11, wherein the processing unit is operating in a first mode, the processing unit being further configured to execute instructions to cause the system to:

receive indication to switch to a second mode;

detect, using the input device of the mobile device, another gesture having a second detected parameter; and identify the other gesture wherein:

the other gesture is identified as a third command to implement a third function related to the virtual model responsive to the second detected parameter of the other gesture being within a parameter range, the third command being different from the first command and the second command, and the third function being different from the first function and the second function.

15. The system of claim 14, wherein the second detected parameter is a detected direction and the preset parameter range is a preset direction range.

16. The system of claim 14, wherein the third function includes one or more of:

adding the product corresponding to the virtual model to a virtual cart, saving current virtual model options, buying the product corresponding to the virtual model, deleting the virtual model from the AR scene, or
exiting the AR scene.

17. The system of claim 11, wherein the processing unit is further configured to execute instructions to cause the system to provide a visual, tactile, and/or audible notification indicating whether the first or the second function is being implemented.

18. The system of claim 11, wherein implementing the first and the second functions depend on the detected speed of the gesture in absence of displaying the first and second functions as selectable options on a screen of the mobile device.

19. A non-transitory computer-readable medium storing instructions that, when executed by a processor of a system, causes the system to:
   display, on a mobile device, a virtual model of a product rendered in an augmented reality (AR) scene;
   detect, using an input device of the mobile device, a gesture having a detected speed; and
   identify the gesture as a command affecting the virtual model within the AR scene, wherein:
      the gesture is identified as a first command to implement a first function that manipulates the virtual model within the AR scene responsive to the detected speed of the gesture being less than a speed threshold, and
      the gesture is identified as a second command to implement a second function that replaces the virtual model within the AR scene with a subsequent virtual model of another product in a defined sequence of virtual models responsive to the detected speed of the gesture being greater than the speed threshold; and
   process the identified gesture.

20. The non-transitory computer-readable medium of claim 19, wherein the first function includes rotating the virtual model in the AR scene on the mobile device or changing a location of the virtual model within the AR scene.

21. The non-transitory computer-readable medium of claim 19, wherein the method is performed in a first mode, the method further comprising:
   receiving indication to switch to a second mode;
   detecting, using the input device of the mobile device, another gesture having a second detected parameter; and
   identifying the other gesture further comprising:
      the other gesture is identified as a third command to implement a third function related to the virtual model responsive to the second detected parameter of the other gesture being within a parameter range, the third command being different from the first command and the second command, and the third function being different from the first function and the second function.

* * * * *